April 13, 1948.  E. H. SHAFF  2,439,756
IMPACT CLUTCH
Filed July 9, 1943  2 Sheets-Sheet 1

Inventor
Ernest H. Shaff
BY
Parker, Carlson, Pitzner & Hubbard
Attorneys.

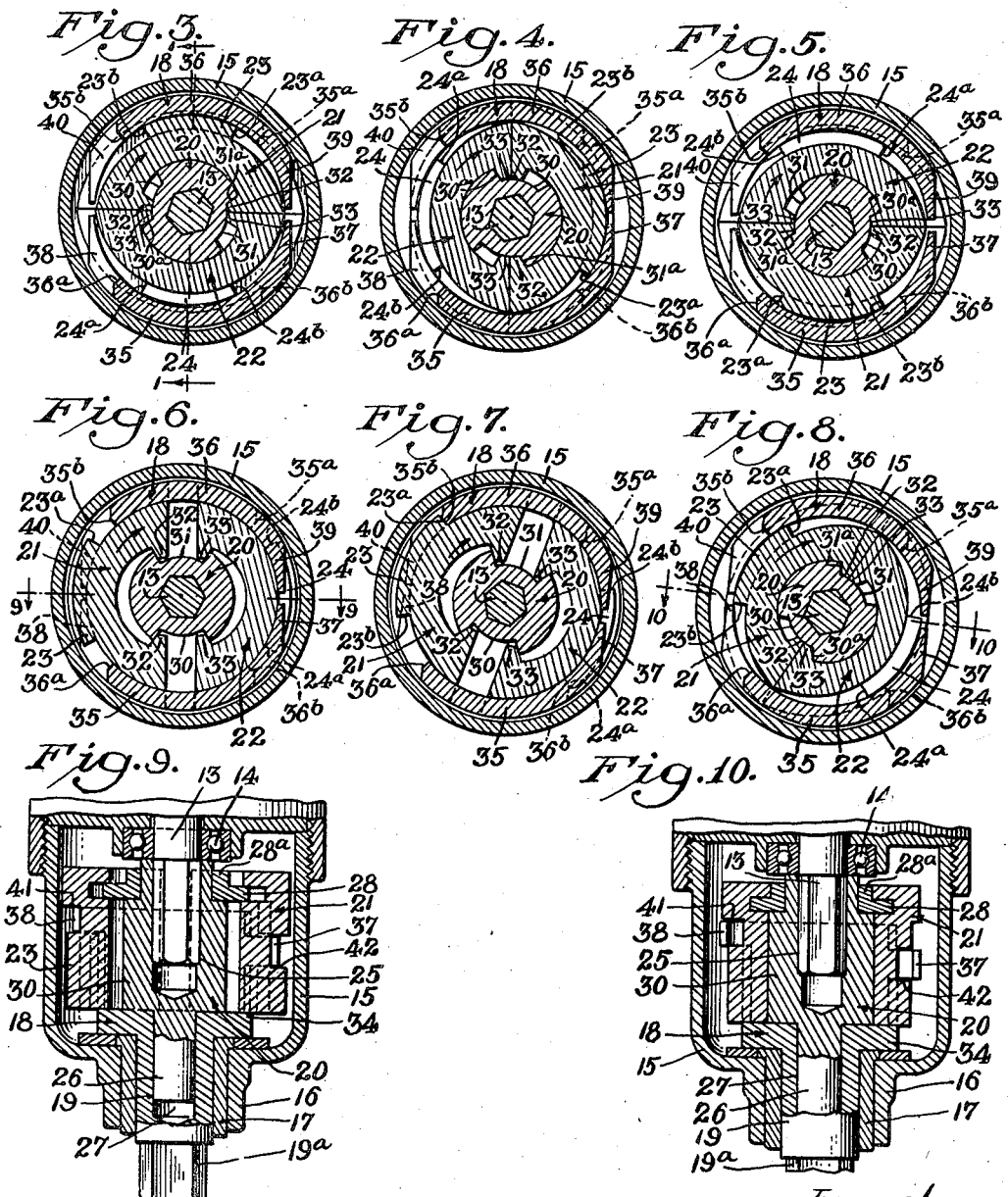

Patented Apr. 13, 1948

2,439,756

UNITED STATES PATENT OFFICE 2,439,756

IMPACT CLUTCH

Ernest H. Shaff, Grand Haven, Mich., assignor to Keller Tool Company, Grand Haven, Mich., a corporation of Michigan Application July 9, 1943, Serial No. 493,961

15 Claims. (Cl. 192—30.5)

The present invention pertains to impact clutches, the type contemplated being especially suited for use in impact wrenches or nut runners.

One object of the present invention is to provide such a clutch in which the impact elements are compelled to make a full revolution after each disengagement thereof and before they can re-engage, whereby a large amount of kinetic energy is accumulated for expenditure upon each successive impact.

More specifically, it is an object of the invention to provide an impact clutch comprising a circular series of driven impact or anvil surfaces and a coacting series of strikers adapted to engage the same simultaneously so as to subject the driven element to a couple, or couples, tending to revolve it, the strikers and driven impact surfaces being automatically disengaged after each successive collision of the strikers with their mating impact surfaces has expended the kinetic energy, but in which the strikers, after disengagement, are compelled to turn through substantially a full revolution before re-engagement, rather than re-engaging the next successive ones of the series of impact surfaces. In this way, a greater amount of kinetic energy is made available in the strikers than would be the case in the latter condition. A device of the character contemplated may be conveniently termed, as has been done herein, a single stroke impact clutch to distinguish it from the multiple stroke type mentioned in which each striker delivers more than one blow during each revolution of the same relative to the driven member.

Another object is to provide such a single stroke impact clutch which is characterized by its simplicity and low cost of construction.

Still another object of the invention is to provide such a single stroke impact clutch employing centrifugally actuated weights for effecting engagement of the strikers with the driven impact surfaces, together with a novel and simplified arrangement for controlling the weights' movements to effect the desired single stroke type of operation.

The invention also resides in an improved arrangement in an impact clutch for retaining proper positioning of the centrifugal weights axially of their driver.

Further objects and advantages of the invention will become apparent as the following description proceeds, taken in connection with the accompanying drawings in which:

Figs. 3 to 8 are a series of stop motion views, all being transverse sections taken substantially along the line 3—3 in Fig. 1, and showing the relative positions of the clutch elements during successive portions of a revolution of the driver relative to the driven member.

Figure 1:
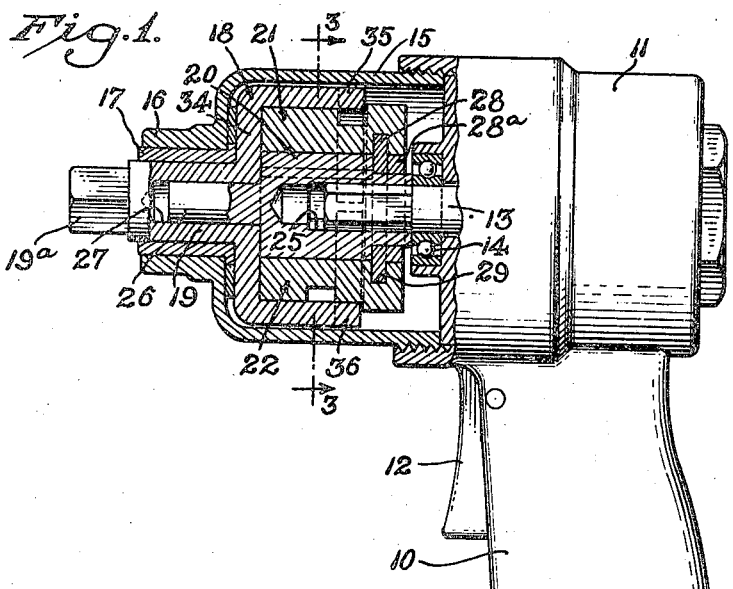
Figure 1 is a side elevation, partly in longitudinal section along the line 1—1 in Fig. 3, of an impact wrench provided with a clutch embodying the present invention.

Figs. 9 and 10 are longitudinal sectional views through the clutch with the elements of the latter in the positions indicated, respectively, in Figs. 6 and 8, the sections being taken substantially along the lines 9—9 and 10—10, respectively.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the illustrative embodiment of the invention, the same has been exemplified as the impact clutch of a wrench or nut runner shown in Fig. 1. Such wrench is of the general class used for power driving of nuts, bolts, or other threaded elements, in applying and removing the same. It comprises a pistol grip handle 10 to which is fixed a cylindrical casing 11 of a reversible pneumatic motor driven by compressed air supplied from a suitable source (not shown) under the control of a trigger 12 in the manner common for such pneumatic tools. Projecting from the forward end of the motor casing is a motor shaft 13 journaled in suitable antifriction bearings 14. This motor shaft extends within a cylindrical housing or casing 15 threaded to the motor casing 11 and having a reduced outer end portion 16. In the latter a sleeve bearing 17 journals the spindle portion 19 of a revoluble driven member, designated generally as 18. The spindle has a squared outer end 19a to which may be applied a suitable socket wrench head or like tool (not shown) for engagement with a threaded member which is to be turned.

The impact clutch exemplifying the present invention is mounted within the housing 15 and in this instance serves to couple the motor shaft 13 to the driven member 18. In brief, the clutch is such that the driven member 18 is revolved continuously, that is, is coupled continuously to the motor shaft 13, until the torque load reaches a predetermined maximum. At the latter point the impact clutch automatically disengages the motor shaft 13 from the driven member 18, whereupon the motor shaft is freed for substantially a full revolution. This full revolution of free rotation of the motor shaft enables it to speed up a striker mechanism incorporated in the clutch, as hereinafter described, so as to store kinetic energy in the same. This kinetic energy is then expended in a blow delivered by the striker mechanism upon the re-engagement of the clutch which ensues after the revolution of free rotation. Thereafter such disengagement and re-engagement of the clutch take place automatically, accompanied by the delivery of a sharp hammer blow upon each re-engagement, so that the threaded member being turned is hammered to effect its further rotation. The impact clutch shown is reversible in operation so that the same general type of action, in reverse sequence, may be employed on opposite directions of rotation for the motor shaft 13 for removing rather than applying a threaded member.

As to the principal elements of the exemplary impact clutch, it comprises a driver designated generally as 20, and a pair of centrifugal weights 21, 22 having strikers in the form of ribs 23, 24, respectively, integral therewith, in addition to the driven member 18 heretofore noted. The strikers 23, 24 have abrupt side faces 23a, 23b and 24a, 24b along their respective side edges constituting driving impact surfaces mating with corresponding abrupt driven impact surfaces, hereinafter detailed, on the driven member 18. As the driver 20 revolves, it carries with it the weights 21, 22 so that they are impelled radially outward by centrifugal force to effect the engagement of the clutch. Automatic retraction of the weights 21, 22 to free the impact surfaces on the strikers from those on the driven member is effected in response to the imposition of a predetermined torque load on the clutch. In accordance with my invention, the positions of the strikers 23, 24 radially relative to the impact surfaces on the driven member is controlled by means of guide surfaces on the weights and on the driven member coacting in the rotational movements of the weights relative to the driven member to the end that only one engagement of the strikers with the driven impact surfaces is permitted during each full revolution of the driver 20 with respect to the driven member 18. In other words, after each disengagement of the impact elements, the strikers must make a full revolution and thus store up a maximum of kinetic energy before they are permitted to re-engage.

Figure 2:
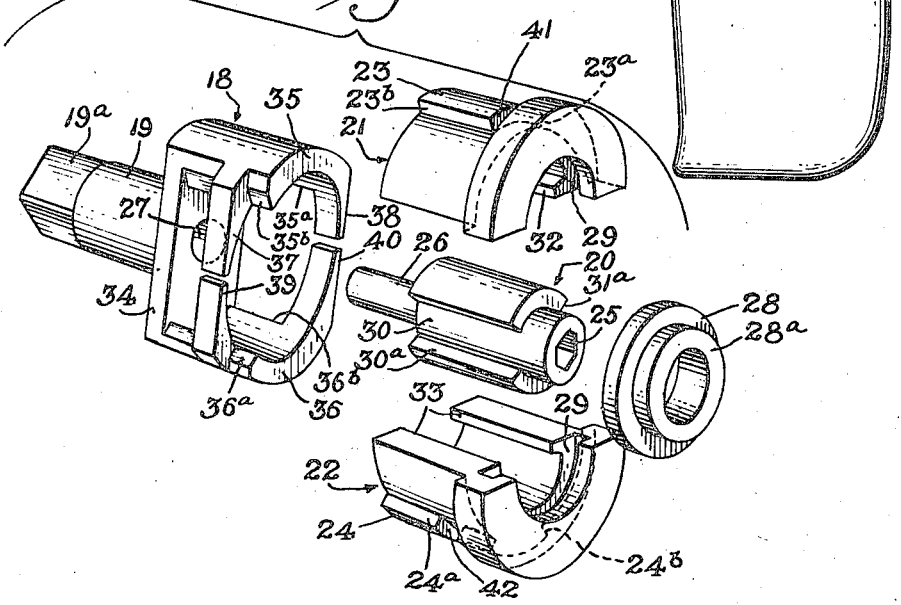
Fig. 2 is an exploded perspective view of the impact clutch included in the device of Fig. 1.

As to the detail of the individual elements of the clutch listed above, attention may first be given to the driver 20. Upon reference to Figs. 1 and 2 it will be seen that it is fashioned in the form of a generally cylindrical spindle having an axial bore 25 therein of hexagonal cross-section in which the complementally shaped end of the motor shaft 13 is received for rigidly coupling the driver to the motor shaft. The outer end 26 of the driver is of reduced round cross-section, being journaled and supported in a bore 27 fashioned in the spindle portion 19 of the driven member 18.

The weights 21, 22 are generally segmental in shape, being arranged in an annular series about the driver. In this instance two such weights of arcuate or half-shell form, embracing the driver, are provided. The peripheries of these weights are relieved to form the integral longitudinally extending ribs or strikers 23, 24 heretofore noted presenting their abrupt impact surfaces 23a, 23b and 24a, 24b at respective opposite sides of the same.

To maintain the weights 21, 22 in proper position axially of the driver while permitting transaxial displacement of the weights during the operation of the clutch, a guide collar 28 is provided. This guide collar has a hub portion 28a press-fitted on the reduced inner end of the driver. The collar itself is received within grooves 29 in the inner surfaces of the weights, such grooves being aligned to form an annular recess extending circumferentially about the driver.

In order to couple the weights 21, 22 in driven relation with the driver 20, the latter has longitudinally extending grooves 30, 31 fashioned in diametrically opposite sides thereof (see Fig. 3). These grooves or notches are so formed as to present opposed end walls comprising flat surfaces facing generally forwardly for corresponding opposite directions of rotation of the driver and inclined forwardly slightly relative to a radial line from the center of the driver. Such opposed surfaces constitute abutment faces 30a and 31a slidably engaged by abutments 32 and 33 on the respective weights. The latter abutments are in the form of inner projections or longitudinally extending ribs 32, 33 hooked within the corresponding notches of the driver. The faces of the abutments 30a and 31a on the weights are shaped to match the abutment surfaces on the drivers and the abutments on the weights are dimensioned so that the weights may move from the retracted position of Fig. 3 to the outward limit position of radial displacement for the weights shown in Figs. 6 and 7.

The function of the abutment arrangement for connecting the weights 21, 22 to the driver 20 described above is threefold. First, the abutments connect the weights to the driver so that they will revolve substantially in unison with it, whereby centrifugal force is applied to the weights to urge them outward to their impact positions. Second, the interengaging abutments limit the outward displacement of the weights to the limit position shown in Fig. 6. Third, the abutments coact to draw the weights automatically inward to their retracted or disengaged position upon the imposition of a predetermined maximum torque load, which results in rotation of the driver relative to the weights. As to the latter, it will be seen upon reference to Figs. 7 and 8 that in the event the torque load is sufficiently great, the driver tends to turn forwardly with respect to the weights, whereupon the abutments 30a and 31a at the trailing ends of the notches 30, 31 in the driver 20 act on the abutments 32, 33 of the weights, contacting the same to pull the weights 21, 22 inward, thus freeing the striker ribs 23, 24 on the weights from the driven member 18.

The driven member 18 is of yoke shape and comprises a transverse member or bar 34 (Fig. 2) integral with the spindle 19. Integral with the outer ends of this transverse member 34 are two diametrically opposed longitudinally extending yoke arms 35, 36 on the opposite side edges of which are presented the driven impact surfaces 35a, 35b and 36a, 36b, such surfaces being thus disposed in a generally circular series. The driven arms 35, 36 are adapted to revolve in a fixed orbit encircling the weights 21, 22 (see Figs. 1 and 3) and the weights are so dimensioned that when they are drawn together to their inner limit positions (shown in Fig. 3) they may revolve freely between the arms 35, 36 of the driven member 18 without contacting the latter.

The function of the guide arms on the driven member 18 has heretofore been noted. As illustrated, there are two such guide arms 37, 38 and 39, 40 projecting from each of the opposite edges of the respective yoke arms 35 and 36. Such guide arms are arranged to embrace the weights in a circumferential direction and are disposed in pairs 37, 39 and 38, 40 with the guide arms in each pair aligned with each other but offset in a direction longitudinal of the yoke arm from the other pair of guide arms. The weights 21, 22, on the other hand, have two grooves on the exterior thereof offset longitudinally to correspond with the guide arms. Thus the weight 21 has a groove 41 aligned with the pair of guide arms 38, 40 and the other weight 22 has a groove 42 aligned with the other pair of guide arms 37, 39. This means that when the weights 21, 22 are at a point in their orbit of revolution such that the arms 38, 40 are in the groove 41 and the arms 37, 39 in the groove 42, the grooves afford sufficient clearance for the confining guide arms that the weights can shift outward into position for impacting engagement with the driven member 18 (see Figs. 6 and 7). On the other hand, when the weights are turned, relative to the driven member 18, through substantially 180 degrees from the position just noted, the guide arms will be out of their aligned grooves and riding over the exteriors of the weights 21, 22 (see Fig. 3) thus restraining the weights against outward displacement into striking position. The weights are thus permitted to shift outward into striking position only once during each revolution of rotation of the same relative to the driven member 18.

By way of brief recapitulation of the operation of the device, reference may be made to the series of views, Figs. 3 to 8, and supplemental views 9 and 10. In Figs. 3 to 8 the device has been depicted for clockwise rotation of the driver 20. At the beginning of the series of views, that is, in Fig. 3, the weights 21, 22 underlie, respectively, the yoke arms 36 and 35. In other words, the weights are so positioned that their exterior grooves 41, 42 are out of registry with the guide arms so that the latter bear on the exteriors of the ribs 23, 24, thereby holding the weights 21, 22 pressed inward toward each other as shown. As the driver 20 turns clockwise, the engagement of the abutments 30a and 31a formed by the notches 30, 31 with the abutment ledges or internal ribs 32, 33 on the weights, revolves the latter with the driver. As the weights continue their rotation, they are held inward by the guide arms until the weights have made substantially a half revolution (Fig. 5), whereupon the guide arms start to enter their respective registering grooves 41, 42, and upon full entry (Fig. 6) the weights are permitted to shift radially outward under the compulsion of centrifugal force. With the weights thus displaced radially outward, the striker surfaces 23a, 24a approach the mating driven impact surfaces 35b, 36b on the driven member 18 (Fig. 6), finally striking the same (Fig. 7).

In the event that a freely turning nut is being driven by the device, the driven member 18 will be revolved in unison with the driver, the impact surfaces remaining in engagement as shown in Fig. 7 until the nut is turned "home" so far that resistance to turning reaches a predetermined maximum. Incidentally, it should be noted in passing that rotation may, of course, start with the weights at any random point of rotational position relative to the driven member rather than precisely that of Fig. 3 which was taken as the starting point in the foregoing outline. That means merely that the relative rotation described will progress so far, and only so far, as required to bring the impact surfaces initially into engagement.

After the resistance to turning of the threaded member being driven reaches a predetermined maximum as noted, the impact clutch takes up what is really its most important function in hammering the threaded member finally into place. When the resistance to turning reaches such point, the driver 20 turns in a forward direction relative to the impeded weights, whereupon the trailing walls of the notches 30, 31 pull or cam the weights inward by their action on the slidably engaged abutment faces of the internal ribs 32, 33. The weights are thus automatically drawn inward into disengaged position so that they may pass beneath the yoke arms 35, 36 (Fig. 8). Thereafter the guide arms restrain the subsequent outward movement of the weights as described so that re-engagement of the impact surfaces cannot take place until after substantially a full revolution following the disengagement. In other words, the striker surfaces 23a, 24a are not permitted to contact the driven impact surfaces 36b, 35b, respectively, but are instead compelled to go on around until they are again in position to strike the impact surfaces 35b, 36b, respectively.

After completing a full revolution following disengagement, the impact surfaces of the clutch re-engage as before (Fig. 7), whereby a heavy blow is delivered by the striker surfaces to the driven impact surfaces. This substantially expends the kinetic energy of the strikers and they are disengaged as previously described. Such intermittent engagement and disengagement of the impact elements of the clutch continues, with a full revolution of the strikers relative to the driven member between each engagement, until the threaded member being operated upon is finally hammered into position.

It will be clear that the symmetrical construction of the coacting parts permits a similar operation in the opposite direction by simply reversing the driver.

As a consequence of the single stroke type of operation effected through the use of the guide arms and coacting peripheral notches in the weights, a large amount of kinetic energy is stored in the striker mechanism for each impact. The full revolution intervening between blows permits the weights to attain substantially greater speed than if such mechanism struck each succeeding driven impact surface, or in other words made only a half turn between blows. In that connection it is to be borne in mind that the kinetic energy increases as the square of the velocity rather than linearly. It has been found that the blow delivered can be increased substantially twenty percent with such single stroke type of actuation as compared to that for a clutch like that shown but omitting the guide means for effecting the single stroke action. It will thus be clear that an important and highly effective improvement in operation has been accomplished by what is, in a structural sense, a very simple means.

I claim as my invention:

1. An impact clutch comprising, in combination, revoluble driving and driven members, said driven member presenting a pair of impact surfaces thereon at symmetrically located, generally diametrically opposite points in an orbit of revolution for the same, striker means for delivering substantially simultaneous sharp impact blows to said symmetrically located impact surfaces to thereby set up a strong couple tending to turn the driven member, said striker means embodying a pair of striker weights revoluble by said driving member coaxially with said driven member and presenting respective striker surfaces thereon also symmetrically located at generally diametrically opposite points relative to the axis of rotation of such weights, and means limiting the outward movement of said striker weights from their axis of rotation under the compulsion of centrifugal force to retain the striker surfaces thereon within an orbit circumscribed by that of the impact surfaces and thus out of contact with the latter except once during each full revolution of relative movement between the striker weights and driven member.

2. An impact clutch comprising, in combination, revoluble driving and driven members, said driven member presenting a pair of impact surfaces thereon at symmetrically located, generally diametrically opposite points in an orbit of revolution for the same, a pair of striker weights revoluble by said driving member coaxially with said driven member and presenting respective striker surfaces thereon also symmetrically located at generally diametrically opposite points relative to the axis of rotation of such weights for substantially simultaneous engagement with the impact surfaces when revolving in the orbit of the latter, and guide means carried by said driven member and embracing said weights for limiting the outward movement of said weights from their axis of rotation under the compulsion of centrifugal force to retain the striker surfaces on the latter within an orbit circumscribed by that of the impact surfaces and thus out of contact with the latter except once during each full revolution of relative movement between the striker weights and driven member.

3. An impact clutch comprising, in combination, coaxially revoluble driving and driven members, means on said driven member presenting a plurality of anvil surfaces at spaced points in a circular path about its axis of rotation, a plurality of striker members presenting impact surfaces adapted to strike against said anvil surfaces, means for connecting said striker members to said driving member to revolve therewith and for movement radially of the latter's axis of rotation under the compulsion of centrifugal force, and guide means for preventing movement of said striker members out into striking position except once during each revolution of the driving member relative to the driven member.

4. An impact clutch comprising, in combination, a driven member having a pair of circumferentially spaced impact surfaces, a driving member coaxial with the driven member, a pair of weights revoluble with the driving member and each having a striker, said weights being movable radially to carry their strikers into and out of the path of said impact surfaces on the driven member, and means controlling the radial positions of said weights comprising two arcuate guide surfaces on each of said weights relatively offset both axially and radially, and circumferentially spaced guide elements on said driven member relatively offset axially for coaction with the respective guide surfaces on each weight at substantially diametrically opposed points in the travel of such weight through one revolution.

5. An impact clutch comprising, in combination, a driven member having an impact surface, a driving member coaxial with the driven member, a weight revoluble with the driven member and having a striker, said weight being movable radially to carry said striker into and out of the path of said impact surface on the driven member, and means controlling the radial position of said weight comprising two arcuate guide surfaces on said weight relatively offset both axially and radially, and circumferentially spaced guide elements on said driven member relatively offset axially and respectively coacting with different guide surfaces on the weight at substantially diametrically opposed points in the travel of the weight through one revolution.

6. An impact clutch comprising, in combination, a driven member having an impact surface, a driving member coaxial with the driven member, a weight revoluble with the driving member and having a striker, said weight being movable radially to carry said striker into and out of the path of said impact surface on the driven member, and means controlling the radial position of said weight comprising two arcuate guide surfaces on said weight relatively offset both axially and radially, and circumferentially spaced guide elements on said driven member relatively offset axially for coaction with the respective guide surfaces at different points in the movement of the weight through a single revolution.

7. An impact clutch comprising, in combination, a driven member having an impact surface, a driving member coaxial with the driven member, a weight revoluble with the driving member and having a striker, said weight being movable radially to carry said striker into and out of the path of the impact surface on said driven member, and means controlling the radial position of said weight comprising a pair of coacting guide surfaces on said weight and driven member, respectively, operative during a portion of the rotational movement of the weight relative to the driven member to hold the weight out of the path of said impact surface, and another pair of coacting guide surfaces on the weight and driven member, respectively, operative during another portion of the rotational movement of the weight relative to the driven member to permit movement of the weight radially so as to carry said striker into the path of said impact surface.

8. An impact clutch comprising, in combination, a driven member having a pair of diametrically opposed impact surfaces, a driving member coaxial with the driven member, a pair of weights revoluble with the driving member and each having a striker, said weights being movable radially to carry their strikers into and out of the path of the impact surfaces on said driven member, and means controlling the radial positions of said weights comprising coacting guide surfaces on said weights and driven member, respectively, operative in one position of the driving member relative to the driven member to hold both of the weights out of the path of its impact surfaces and other coacting guide surfaces on said weights and driven member, respectively, operative in another position of the driving member relative to the driven member to permit movement of both of the weights simultaneously outward in a radial direction so as to carry their strikers into the path of said impact surface for coincident striking engagement therewith.

9. An impact clutch comprising, in combination, a revoluble driver, an annular series of generally segmental striker weights disposed in embracing relation about the driver and each presenting a striker surface on its exterior portion, means connecting the weights in driven relation with the driver while permitting radial movement of the weights outward from the driver under the compulsion of centrifugal force, a driven member revoluble coaxially with the driver and presenting a series of impact-receiving surfaces thereon in a circular series about said weights, said impact-receiving surfaces corresponding to the striker surfaces in number and in angular spacing about the axis of rotation, said series of weights being grooved circumferentially, and guide arms on said driven member positioned to ride in said grooves in embracing relation to the weights, the contacting inner surfaces of said guide arms and the groove roots being shaped and positioned to hold said weights inward sufficiently that their striker surfaces pass freely by the encircling series of impact-receiving surfaces except for one outward movement of each weight into impacting position during each full revolution of relative rotation between the driving and driven members.

10. A reversible impact clutch comprising, in combination, coaxially rotatable driving and driven clutch members each including a spindle and arranged with such spindles disposed in substantially end-to-end relation, a yoke rigid with the driven spindle and arranged with its arms paralleling the driving spindle in spaced relation to the same on diametrically opposite sides thereof, a pair of half-shell weights loosely embracing the driving spindle and located within the yoke arms, each of said weights having a longitudinal rib on its exterior, said yoke arms and ribs presenting abrupt impact surfaces on opposite sides of each and lying substantially in planes coincident with the axis of rotation of said spindles, means connecting said weights in driven relation with the driving spindle while permitting outward movement of the weights under the influence of centrifugal force, and means for restraining said weights against movement outward under the compulsion of centrifugal force into position for impact of the ribs thereon during substantially a full revolution of the weights relative to the driven member following each disengagement of the weights from the driven member, whereby only one impacting engagement of the ribs with the yoke arms is permitted during each full revolution of relative rotation between the driving and driven members, said last-mentioned means including two pairs of guide arms extending from the sides of the yoke arms toward the other in a direction circumferentially about the weights, one guide arm of each pair being located on each yoke arm and one pair of guide arms being offset longitudinally of the weights from the other pair, and one of said weights having a peripheral groove therein aligned with one pair of guide arms and the other weight having a peripheral groove therein aligned with the other pair of guide arms.

11. An impact clutch comprising, in combination, a revoluble driver, a plurality of striker weights disposed in an annular series about the driver and each presenting a striker surface on its exterior, a driven member revoluble coaxially with said driver and presenting a circular series of impact surfaces located in encircling relation about the weights and corresponding in number and angular spacing to the striker surfaces on the latter, the driver and weights having slidably engaging abutments rigid therewith connecting the weights for rotation with the driver while permitting outward movement of the weights under the compulsion of centrifugal force during their rotation in unison and operative as an incident to angular displacement of the driver relative to the weights upon impact of the latter's striker surfaces against the impact surfaces on said driven member for drawing the weights inward for rotation in a lesser orbit out of contact with such impact surfaces, and guide means in contact with said weights permitting outward movement of the same into striking position only once during each full revolution of the driver relative to the driven member.

12. An impact clutch comprising disengageable relatively revoluble impact elements, a revoluble driver spindle, means including a plurality of generally segmental weights disposed in an annular series about said driver spindle for effecting relative movement of said impact elements into engaging position, said weights each having a groove on its inner surface and arranged with the grooves of the several weights aligned to form a continuous annular recess extending circumferentially about the spindle, and a collar rigid with the spindle and positioned in said annular recess for preventing displacement of said weights axially of the spindle while permitting movement of the same transaxially of the spindle.

13. An impact clutch comprising a coaxially rotatable driving spindle and driven member, a plurality of generally segmental weights disposed in an annular series about said driver spindle and each having a striker surface on the exterior thereof, said driven member presenting a circular series of impact surfaces encircling the series of striker surfaces on said weights, said weights being movable radially outward from said driven spindle under the compulsion of centrifugal force to bring their striker surfaces into an orbit matching that of the impact surfaces for engagement with the latter, and means including integral abutments on the inner surfaces of said weights hooked under and disposed in sliding engagement with complemental abutments rigid with the driver spindle for connecting the weights in driven relation with the driver spindle and for drawing the weights inward for disengagement of their striker surfaces from said impact surfaces in response to rotation of the driver spindle relative to the weights, said weights each having a groove on its inner surface and arranged with the grooves of the several weights aligned to form a continuous annular recess extending circumferentially about the spindle, and a collar rigid with the spindle and positioned in said annular recess for preventing displacement of said weights axially of the spindle while permitting movement of the same transaxially of the spindle.

14. An impact clutch comprising a coaxially rotatable driving spindle and driven member, a plurality of generally segmental weights disposed in an annular series about said driver spindle and each having a striker surface on the exterior thereof, said driven member presenting a circular series of impact surfaces encircling the series of striker surfaces on said weights, said weights being movable radially outward from said driver spindle under the compulsion of centrifugal force to bring their striker surfaces into an orbit matching that of the impact surfaces for engagement with the latter, and means including integral abutments on the inner surfaces of said weights hooked under and disposed in sliding engagement with complemental abutments rigid with the driver spindle for connecting the weights in driven relation with the driver spindle and for drawing the weights inward for disengagement of their striker surfaces from said impact surfaces in response to rotation of the driver spindle relative to the weights.

15. In an impact clutch, the combination of a plurality of driving impact elements and an equal number of driven impact elements, both the driving and driven elements being revoluble about a common axis and movable relative to each other in a direction generally radially of such axis into and out of engaging relation, each of said driving elements being shaped for engagement with any one of the plurality of driven elements, and means including guide members on one set of elements axially offset with respect to each other and correspondingly offset guide surfaces on the other set of elements coacting with said guide members to limit said relative movement of the impact members into engagement to not more than one such movement during each full revolution of said elements relative to each other.

ERNEST H. SHAFF.

REFERENCES CITED

The following references are of record in the file of this patent:

UNITED STATES PATENTS

| Number | Name | Date |
|---|---|---|
| 2,240,649 | Henschel | May 6, 1941 |
| 2,326,347 | Forss | Aug. 10, 1943 |
| 2,339,530 | Van Sittert et al. | Jan. 18, 1944 |
| 2,343,332 | Shaff | Mar. 7, 1944 |